T. T. BARBER.
ROAD MAKING DEVICE.
No. 49,693. Patented Sept. 5, 1865.
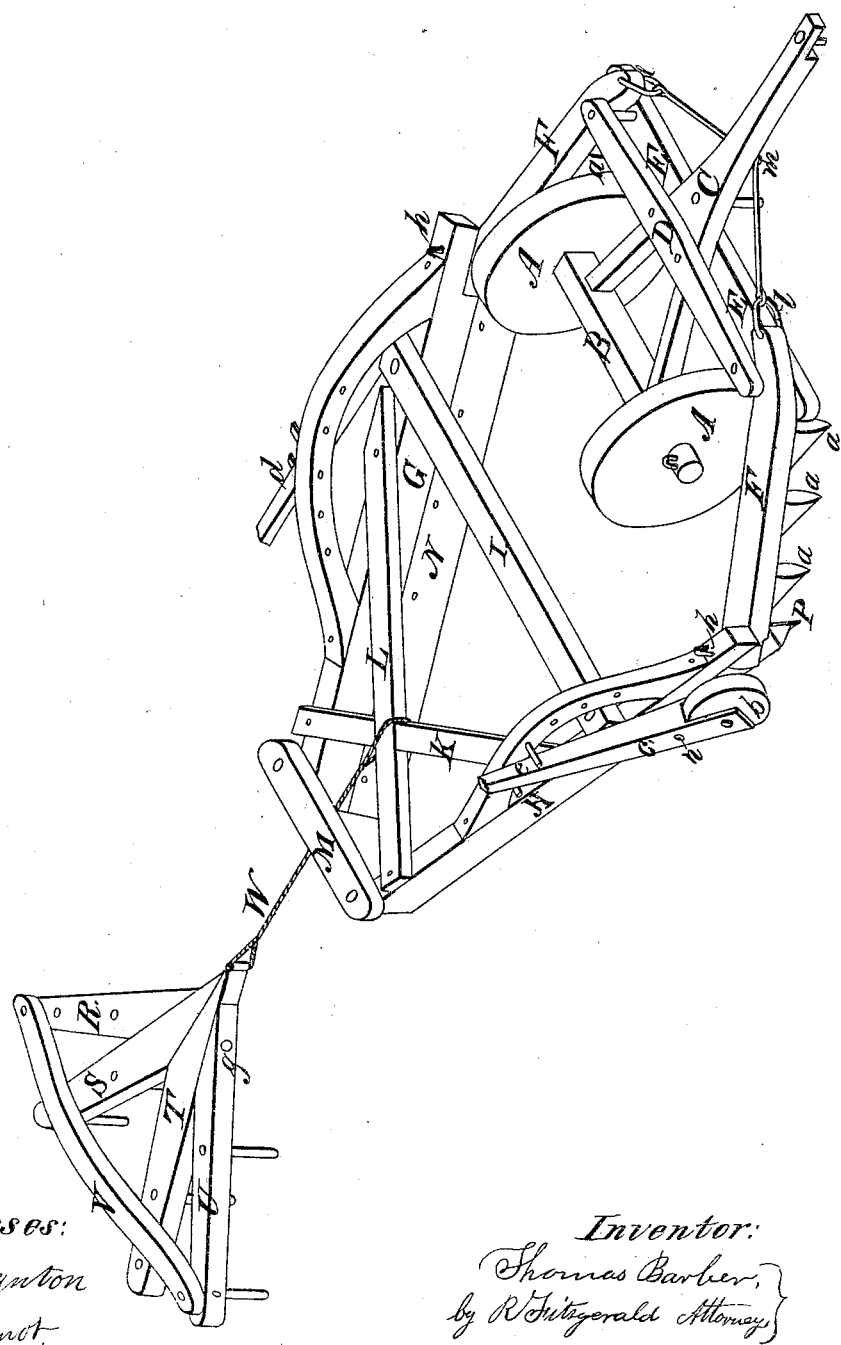
Witnesses:
L. W. Boynton
Asa Wilmot
Inventor:
Thomas Barber,
by R. Fitzgerald Attorney

UNITED STATES PATENT OFFICE.

THOMAS T. BARBER, OF HAMPTON, CONNECTICUT.

IMPROVED ROAD-MAKING DEVICE.

Specification forming part of Letters Patent No. 49,693, dated September 5, 1865.

*To all whom it may concern:*

Be it known that I, THOMAS T. BARBER, of the town of Hampton, in the county of Windham and State of Connecticut, have invented a new and useful Improvement in Apparatus for Making Roads; and I do hereby declare that the following is a full, clear, and exact description of the construction, character, and operation of the same, reference being had to the accompanying drawing, which makes part of this specification, which drawing is a perspective view of the whole apparatus.

My improvement consists in making an apparatus for road-making composed of draft-gear, plows, scrapers, and harrow, with all the convenient appendages, included in one article, so that with a team of sufficient strength the ground may be plowed, (along the two sides of the road,) scraped regularly crowning to the center, and the central part smoothed, all by once passing over the road.

I make the draft-gear or wheel part of two truck-wheels, A A, of suitable diameter for convenience of drawing, and also in some degree for gaging the plows, with a suitable axle-tree, B, and tongue or pole C, and two cross-bars, D and E E, by which to guide the plows, &c., all as shown in the drawing.

I make the gangs of plows, as shown at a a, &c., of a suitable shape and structure, and fit or secure them in suitable stocks or beams, as F and F, in such a position that each will turn its furrow inward or toward the center of the road, having the beams F and F so adjusted that the forward plow on each beam will be nearest to the center of the road, all as shown and indicated in the drawing.

I make the double scraper of two suitable beams or sides, G and H, and secure them together by suitable bars or braces, as I, K, L, and M, or by any other suitable means, so as to hold them firmly in their inclined relation to each other, and I arrange their incline and length so that the two beams will form substantially the two sides of an equilateral triangle, with a small portion of the apex removed and the part which would be the base left open, as the forward end, all substantially as shown in the drawing. I make the front or flaring end wide enough for the part of the road to be worked so as to scrape from the extreme outside to near the center at one operation or passage of the team.

On the inner side, and toward the lower edge of each of the beams G and H, I fit a suitable scraper, as N, on the beam G, and the front end of the other is shown at P on the beam H. I make these scrapers of long plates of steel or any other suitable material, and secure them to beams by screws or by any other proper and efficient means. Upon each of these beams I attach a roller, as b, (the other being concealed,) which I work by a lever, as c or d, to raise up each side of the scraper, when desired, to leave the dirt, pass over stones, or when it is not desired to use the scraper, &c. These levers may be worked by hand, or may be secured at any desired position by the pins at d and e. These levers work on joint or fulcrum pins, as indicated at n, on lever c.

I make the harrow of four bars or beams, as R S T U, and connect the two outer bars, R and U, with a vertically-curved cross-bar, V, and secure them to the inner pair by a joint-pin, g, on which they work freely, to avoid bad effects from stones or other impediments.

Having made the several parts as before described, I attach the rear ends of the scraper-beams F and F to the front ends of the beams G and H by joint-pins, as shown at h and h, and I attach the draft-wheels A and A (and their appendages) to the front ends of the plow-beams F and F by having the beams intercept, and having a chain or other flexible connection attached to the links l and l in the front ends of the plow-beams F and F and pass freely through a loop, m, under the pole or tongue C; and I connect the harrow by means of a flexible cord or chain of suitable length, as shown at W, when the whole will be ready for use, as shown in the drawing.

To use this road-making apparatus I hitch the oxen (as many as are needed) to the pole or tongue and draw the whole forward, when the plows will plow up the soil near the two sides of the road, (turning the furrows inward or toward the center of the road,) and the scrapers N and P will follow in such a manner that their front ends will enter the two outward furrows, and as they converge toward their rear ends will scrape the loose dirt or soil to the center of the road, and the harrow smooth or level the central part of the road, so that it will be fit to use immediately after the passage of the apparatus.

When the road needs deeper plowing than can be done at one operation it may be repeated as often as it is required.

What I claim as my invention, and desire to secure by Letters Patent, is—

1. The combination of the two gangs of plows and the draft-gear with the scrapers, when the whole is constructed and fitted for use substantially as herein described and set forth.

2. The combination of the scrapers with the harrow, when both are constructed, connected, and fitted to produce the result of scraping and leveling, substantially as herein described and set forth.

THOMAS T. BARBER.

Witnesses:
PATRICK H. PEARL,
L. W. BOYNTON.